United States Patent
Factor et al.

(10) Patent No.: US 8,909,882 B2
(45) Date of Patent: Dec. 9, 2014

(54) CONCURRENT DATA PROCESSING USING SNAPSHOT TECHNOLOGY

(75) Inventors: Michael Factor, Haifa (IL); Vladimir Lipets, Haifa (IL); Paula Kim Ta-Shma, Tel Aviv-Jaffa (IL); Avishay Traeger, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 1094 days.

(21) Appl. No.: 12/623,418

(22) Filed: Nov. 22, 2009

(65) Prior Publication Data

US 2011/0125978 A1    May 26, 2011

(51) Int. Cl.
| | | |
|---|---|---|
| G06F 12/00 | (2006.01) | |
| G06F 13/00 | (2006.01) | |
| G06F 13/28 | (2006.01) | |
| G06F 7/00 | (2006.01) | |
| G06F 17/00 | (2006.01) | |
| G06F 17/30 | (2006.01) | |
| G06F 11/14 | (2006.01) | |

(52) U.S. Cl.
CPC ...... *G06F 17/30563* (2013.01); *G06F 11/1471* (2013.01); *G06F 17/30569* (2013.01); *G06F 2201/84* (2013.01)
USPC ............................ 711/162; 707/602; 707/632

(58) Field of Classification Search
None
See application file for complete search history.

(56) References Cited

U.S. PATENT DOCUMENTS

| 7,546,431 B2 | 6/2009 | Stacey et al. |
| 2002/0161778 A1 | 10/2002 | Linstedt |
| 2007/0180436 A1 | 8/2007 | Travostino et al. |
| 2008/0010284 A1 | 1/2008 | Beck |
| 2009/0043740 A1 | 2/2009 | Olsen |

OTHER PUBLICATIONS

Vassiliadis et al., Near Real Time ETL, 2009, Springer, 31 pages.*
Dayal et al., Data Integration Flows for Business Intelligence, 2009, ACM, 11 pages.*
Panos Vassiliadis, "Near Real Time ETL", University of Ioannina, Ioannina, 45110 and Stanford University, Palo Alto, California, USA.
Jonghyun Lee, "Enhancing Data Migration Performance via Parallel Data Compression", International Parallel and Distributed Processing Symposium—Symposium Volume, 2002, vol. 1, pp. 0047, IEEE.
Factor, M., et al. Final Office Action for U.S. Appl. No. 13/610,577, received on May 24, 2013. Original filing date Sep. 11, 2012.

* cited by examiner

*Primary Examiner* — April Y Blair
*Assistant Examiner* — Gary W Cygiel
(74) *Attorney, Agent, or Firm* — Eyal Gilboa; Kevin D. Kehe

(57) ABSTRACT

A method for processing data using snapshots is provided. The method comprises generating a primary snapshot of data stored in a first storage medium, wherein the primary snapshot is a copy of the data stored in the first storage medium at a point in time; generating one or more secondary snapshots of the primary snapshot, wherein the secondary snapshots are copies of the data stored on the first storage medium at the point in time; and extracting the data stored in the first storage medium at the point in time by accessing the data included in the secondary snapshots, wherein multiple processing units concurrently transform the extracted data and load the transformed data onto a second storage medium.

25 Claims, 4 Drawing Sheets

CONCURRENT DATA PROCESSING USING SNAPSHOT TECHNOLOGY

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of the claimed subject matter to material associated with such marks.

TECHNICAL FIELD

The claimed subject matter relates generally to concurrent data processing systems and, more particularly, to concurrent data processing using snapshot technology.

BACKGROUND

An extract, transform, and load (ETL) system refers to a system that processes data by extracting the data from an external source (e.g., database), transforming the data to fit the operational needs of a target system, and loading the data onto the target system (e.g., a data warehouse). An ETL system is scalable if the ETL system is able to handle varying volumes of data by proportionally allocating lesser or additional resources to handle the data either at the source or the target.

In most ETL systems, concurrent extraction of data from a source and further management of the data for concurrent transformation and loading is not supported. The above results in a bottleneck effect which leads to inefficient management of the data across the entire system.

SUMMARY

The present disclosure is directed to systems and corresponding methods that facilitate data processing using snapshots.

For purposes of summarizing, certain aspects, advantages, and novel features have been described herein. It is to be understood that not all such advantages may be achieved in accordance with any one particular embodiment. Thus, the claimed subject matter may be embodied or carried out in a manner that achieves or optimizes one advantage or group of advantages without achieving all advantages as may be taught or suggested herein.

In accordance with one embodiment, a method for processing data using snapshots is provided. The method comprises generating a primary snapshot of data stored in a first storage medium, wherein the primary snapshot is a copy of the data stored in the first storage medium at a point in time; generating one or more secondary snapshots of the primary snapshot, wherein the secondary snapshots are copies of the data stored on the first storage medium at the point in time; and extracting the data stored in the first storage medium at the point in time by accessing the data included in the secondary snapshots, wherein multiple processing units concurrently transform the extracted data and load the transformed data onto a second storage medium.

In accordance with another embodiment, a system comprising one or more logic units is provided. The one or more logic units are configured to perform the functions and operations associated with the above-disclosed methods. In accordance with yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The claimed subject matter is not, however, limited to any particular embodiment disclosed.

BRIEF DESCRIPTION OF THE DRAWINGS

Embodiments of the claimed subject matter are understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXEMPLARY EMBODIMENTS

In the following, numerous specific details are set forth to provide a thorough description of various embodiments of the claimed subject matter. Certain embodiments may be practiced without these specific details or with some variations in detail. In some instances, certain features are described in less detail so as not to obscure other aspects of the disclosed embodiments. The level of detail associated with each of the elements or features should not be construed to qualify the novelty or importance of one feature over the others.

Figure 1:
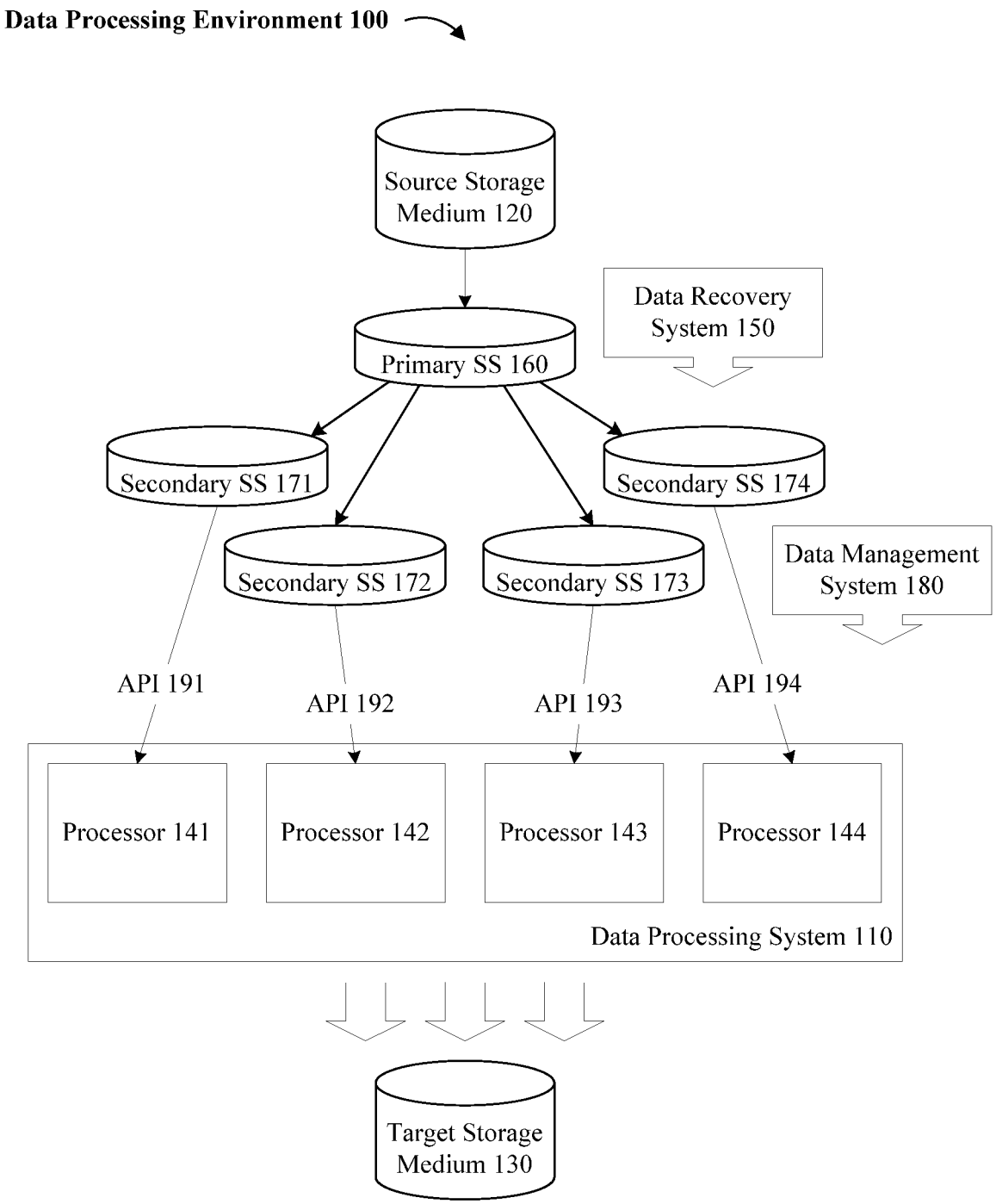
FIG. 1 illustrates an exemplary ETL environment, in accordance with one or more embodiments.

Referring to FIG. 1, in accordance with one or more embodiments, an exemplary data processing environment 100 comprises a data processing system 110, a source comprising a source storage medium 120, and a target comprising a target storage medium 130. The data processing system 110 may include a processing unit comprising one or more processors 141, 142, 143, 144 for concurrently transforming data extracted from the source storage medium 120 and loading the transformed data to the target storage medium 130.

The transforming stage refers to applying a series of rules or functions to the data extracted from the source system to derive the data for loading into the target system. Depending on implementation, one or more of the transformation types provided below may be performed to meet the business or technical requirements of a target system:

Filtering
Sorting
Aggregation
Generating surrogate-key values
Joining data from multiple sources (e.g., lookup, merge)
Applying any form of simple or complex data validation.

Deriving a new calculated value (e.g., sale_amount=qty*unit_price)

Selecting certain columns to load or selecting null columns not to load

Encoding free-form values (e.g., mapping "Male" to "1" and "Mr" to M)

Transposing or pivoting (turning multiple columns into multiple rows or vice versa)

Splitting a column into multiple columns (e.g., putting a comma-separated list specified as a string in one column as individual values in different columns)

Disaggregation of repeating columns into a separate detail table (e.g., moving a series of addresses in one record into single addresses in a set of records in a linked address table)

Translating coded values (e.g., if the source system stores 1 for male and 2 for female, but the warehouse stores M for male and F for female), this calls for automated data cleansing;

The loading phase refers to the process of loading the data into the target system, such as a data warehouse (DW). In some implementations, the transformed data may overwrite existing information stored on the target storage medium 130 with cumulative, updated data or alternatively add new data in clusters.

In one embodiment, a data recovery system 150 may be provided to support copying and recovery of data stored in the source storage medium 120. Depending on implementation, the data recovery system 150 may be implemented over a software, or a hardware platform, or a combination of both to perform data copying and recovery procedures as provided in further detail below.

The data recovery system 150 may include snapshot capabilities such as generation of snapshots, generation of snapshots of snapshots, or simultaneous modification of snapshots. A snapshot refers to a point-in-time copy of a set of files or directories, a storage volume, or other storage medium. The snapshot may be implemented using a copy-on-write mechanism that copies data stored in the storage medium, just before the data is modified, to preserve a self-consistent past image of the storage medium.

In certain embodiments, advantageously, when the snapshot is taken, selected data that is to be modified after the particular point in time is copied. Since the unmodified data is not copied, a snapshot can be generated a lot more efficiently than an entire backup of the data at a certain point in time. In other words, the time and copying needed to create the snapshot does not increase with the size of the snapshot data set created as a result of the snapshot, whereas the same for a direct backup is proportional to the size of the entire data set that is being backed up.

Referring back to FIG. 1, the data recovery system 150 may generate a snapshot (i.e., primary snapshot 160) of the source storage medium 120 and one or more snapshots of the primary snapshot 160 (e.g., secondary snapshots 171, 172, 173, 174). As used herein, a primary snapshot refers to a snapshot of a storage medium, and a secondary snapshot refers to a snapshot of the primary snapshot. The number of secondary snapshots is desirably equal or proportional to the number of processing resources (e.g., processors 141, 142, 143, 144) available at the data processing system 110. The processing resources are implemented to transform the data extracted from the source storage medium 120 and load it to the target storage medium 130.

In one embodiment, a data management system 180 may be implemented as a part of data processing system 110 or independent from the data processing system 110 to support extracting data from the secondary snapshots created by data recovery system 150. In one embodiment, the data management system 180 is implemented over a software, or a hardware platform, or a combination of both to extract data which is to be transformed and loaded to target storage medium 130. In certain implementations, the functions performed by data recovery system 150 and the data management system 180 may be combined or divided into one or more operational modules that execute over a local or distributed computing environment.

The data management system 180 may instantiate one or more application programming interfaces (APIs) to allow the processors 141, 142, 143, 144, respectively extract data from the secondary snapshots. For example, APIs 191, 192, 193, 194 may be instantiated to support and control access to data on the secondary snapshots. Data processing system 110, in some embodiments, supports and controls the parallel and proportional allocation of data extracted from the secondary snapshots 171, 172, 173, 174, to the processors 141, 142, 143, 144, respectively.

In alternative embodiments, instead or in addition to utilizing processors 141, 142, 143, 144, a multiprocessing platform may be utilized to invoke multiple processes (e.g., multiple instances of a function or software application) to transform the data retrieved from the secondary snapshots 171, 172, 173, 174 by way of the APIs 191, 192, 193, 194. Accordingly, the different data chunks stored on source storage medium 120 may be processed concurrently instead of sequentially once multiple APIs and processors are implemented to extract and transform the data.

Figure 2:
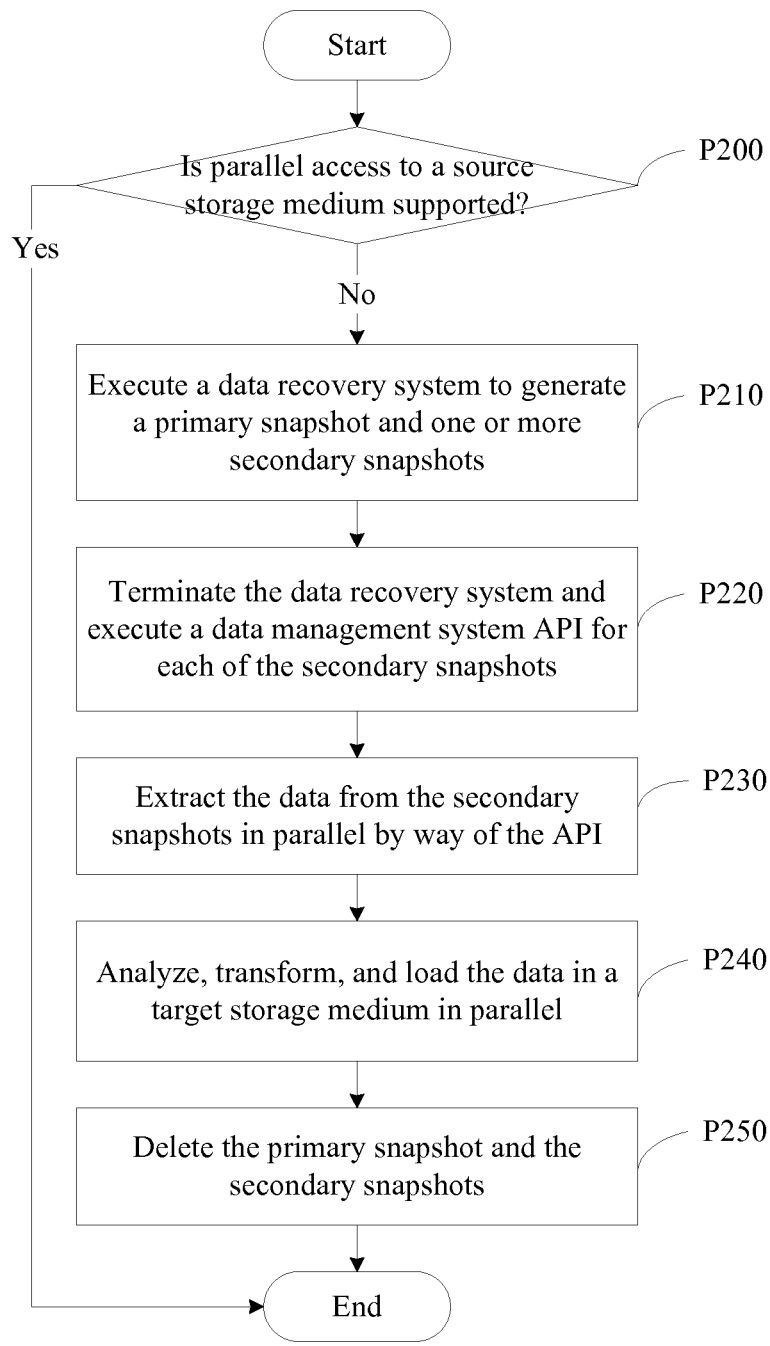
FIG. 2 is a flow diagram of a method for extracting and transforming data using snapshot technology, in accordance with one embodiment.

Referring to FIGS. 1 and 2, in accordance with one embodiment, the data processing system 110 may be an ETL system that extracts data from the source storage medium 120, analyzes and transforms the data, and loads the data in the target storage medium 130. To extract the data stored in the source storage medium 120, the data processing system 110 determines whether parallel access to the source storage medium 120 is supported (P200).

If parallel access is not supported, the data recovery system 140 generates a snapshot of the source storage medium 120 (i.e., primary snapshot 150) and one or more snapshots of the primary snapshot 160 (i.e., secondary snapshots 171, 172, 173, 174) (P210). The primary snapshot is desirably generated according to a data recovery scheme that recovers the data from the source storage medium 120 as if the data is being recovered after a power failure, for example. This exemplary scheme leads to improved performance and ensures that the secondary snapshots are consistent with each other, since the secondary snapshots are generated from the primary snapshot 160.

It is noteworthy that both the primary snapshot 160 and the secondary snapshots 171, 172, 173, 174 are copies of the source storage medium 120 at the same point in time. Also, as provided earlier, data that is subject to a snapshot is not physically copied, unless the data is modified after the particular point in time. Thus, the snapshot may be generated virtually instantaneously (i.e., on-demand and with relatively low latency and overhead) regardless of the total amount of data stored in the source storage medium 120.

In one embodiment, the primary or the secondary snapshots are generated according to a data recovery scheme that recovers the data from the source as if the data is being recovered after a power failure. In some implementations, once the primary and secondary snapshots are generated, the data recovery system 150 is terminated and a data management system 180 API is instantiated for each of the secondary snapshots (i.e., APIs 191, 192, 193, 194) (P220). The API instances 191, 192, 193 and 194 support data interface between the secondary snapshots 171, 172, 173, 174 and the computing processors 141, 142, 143, 144, respectively, to allow the concurrent extraction of data from the secondary snapshots (P230).

In one embodiment, the source data on the secondary snapshots is proportionally distributed to the processors 141, 142, 143, 144 according to their processing power and other related factors. For example, if the data stored in the source storage medium 120 can be divided into 100 data chunks and the processor 141 has twice the processing power of processors 142, 143, 144, then 40 chunks of the data may be allocated to processor 141, and 20 chunks of data may be allocated to processors 142, 143, and 144 each. In one example, a partitioning algorithm may be utilized to divide data into distinct subsets. For example, if the data represents "Call Data Records", the data may be divided according to "Calling Region."

Upon receiving the data by way of the API 191, 192, 193, 194, the processors 141, 142, 143, 144 may concurrently analyze, transform, and load the data onto the target storage medium 130 (P240). For example, processor 141 may analyze, transform, and load the first 40 chunks of the data, and processors 142, 143 and 144 may concurrently analyze, transform, and load the other 60 chunks of the data, 20 chunks each.

To accomplish the above, parallel access to the target storage medium 130 is supported in one or more embodiments. Once the data is processed (i.e., extracted, transformed, and loaded), the primary snapshot 160 and the secondary snapshots 171, 172, 173, 174 may be deleted by data management system 180 (P250).

Since processors 141, 142, 143, 144 are configurable to concurrently extract and transform the data stored on the secondary snapshots, the data processing system 110 is scalable with respect to extracting, transforming, and loading the data in target storage medium 130. It is noteworthy that the amount of time utilized to generate the primary snapshot 160 and the secondary snapshots 171, 172, 173, 174 to support parallel data extraction from the source storage medium 120 is relatively insignificant because, as provided earlier, the snapshots may be generated relatively instantaneously and inexpensively due to the efficient nature of the snapshot mechanism of the data recovery system 150.

Further, using snapshots to process the data ensures operational efficiency and data consistency. Operational efficiency is ensured because data stored in the source storage medium 120 may be modified without disrupting data processing since the data is extracted from the secondary snapshots 171, 172, 173, 174 instead of the source storage medium 120. Data consistency is ensured because each of the secondary snapshots 171, 172, 173, 174 is a snapshot of the primary snapshot 160, and is thus consistent with the other secondary snapshots.

In different embodiments, the claimed subject matter may be implemented either entirely in the form of hardware or entirely in the form of software, or a combination of both hardware and software elements. For example, the data processing environment 100 may comprise one or more controlled computing system environments that may be presented largely in terms of hardware components and software code executed to perform processes that achieve the results contemplated by the system of the claimed subject matter.

Figure 3:
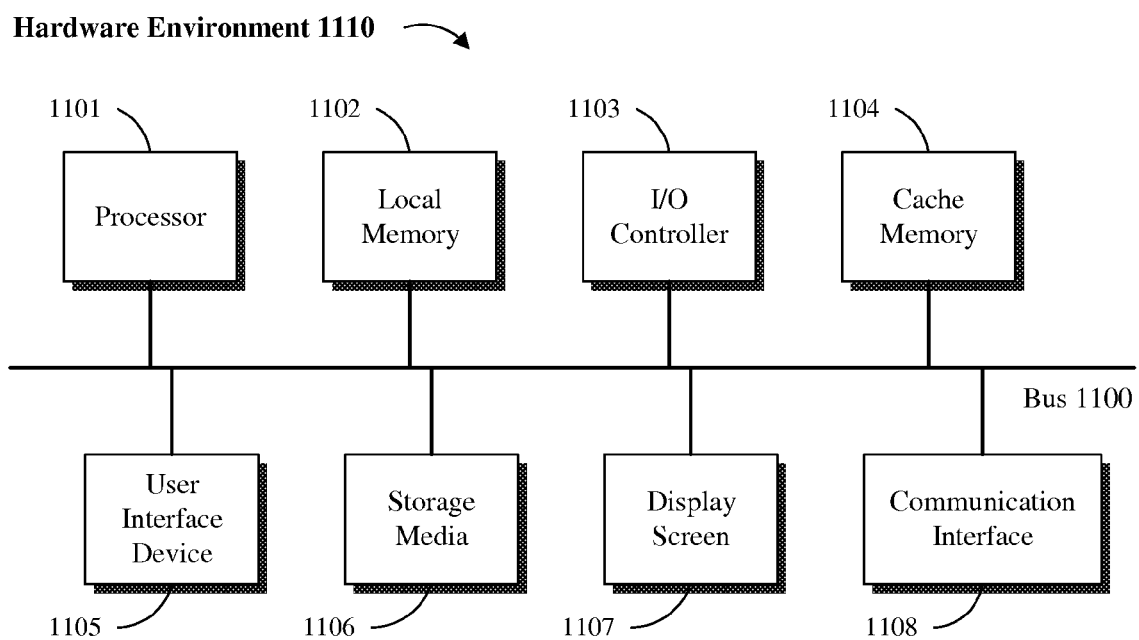
FIGS. 3 and 4 are block diagrams of hardware and software environments in which a system of the present invention may operate, in accordance with one or more embodiments.
Figure 4:
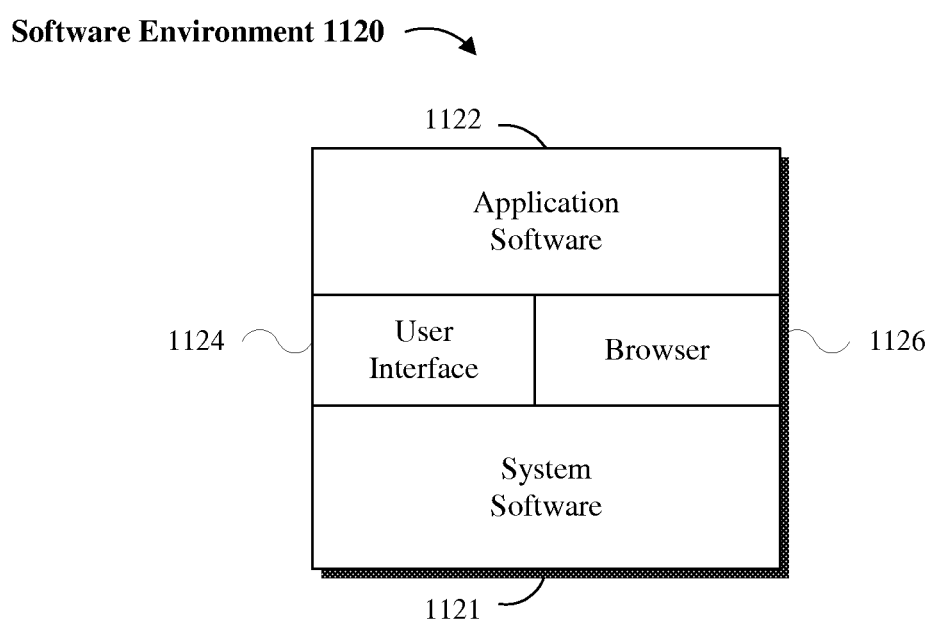

Referring to FIGS. 3 and 4, a computing system environment in accordance with an exemplary embodiment is composed of a hardware environment 1110 and a software environment 1120. The hardware environment 1110 comprises the machinery and equipment that provide an execution environment for the software; and the software environment 1120 provides the execution instructions for the hardware as provided below.

As provided here, software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 1120 is divided into two major classes comprising system software 1121 and application software 1122. In one embodiment, the data processing system 110, the data recovery system 140, or the data management system 180 may be implemented as system software 1121 or application software 1122 executed on one or more hardware environments to facilitate data processing using snapshots.

System software 1121 may comprise control programs, such as the operating system (OS) and information management systems that instruct the hardware how to function and process information. Application software 1122 may comprise but is not limited to program code, data structures, firmware, resident software, microcode or any other form of information or routine that may be read, analyzed or executed by a microcontroller.

In an alternative embodiment, the claimed subject matter may be implemented as computer program product accessible from a computer-usable or computer-readable medium providing program code for use by or in connection with a computer or any instruction execution system. For the purposes of this description, a computer-usable or computer-readable medium may be any apparatus that can contain and store the program for use by or in connection with the instruction execution system, apparatus, or device.

The computer-readable medium may be an electronic, magnetic, optical, electromagnetic, infrared, or semiconductor system (or apparatus or device). Examples of a computer-readable medium include a semiconductor or solid-state memory, magnetic tape, a removable computer diskette, a random access memory (RAM), a read-only memory (ROM), a rigid magnetic disk, and an optical disk. Current examples of optical disks include compact disk read only memory (CD-ROM), compact disk read/write (CD-R/W) and digital video disk (DVD).

Referring to FIG. 3, an embodiment of the application software 1122 may be implemented as computer software in the form of computer readable code executed on a data processing system such as hardware environment 1110 that comprises a processor 1101 coupled to one or more memory elements by way of a system bus 1100. The memory elements, for example, may comprise local memory 1102, storage media 1106, and cache memory 1104. Processor 1101 loads executable code from storage media 1106 to local memory 1102. Cache memory 1104 provides temporary storage to reduce the number of times code is loaded from storage media 1106 for execution.

A user interface device 1105 (e.g., keyboard, pointing device, etc.) and a display screen 1107 can be coupled to the computing system either directly or through an intervening I/O controller 1103, for example. A communication interface unit 1108, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 1110 may not include all the above components, or may comprise other components for additional functionality or utility. For example, hardware environment 1110 can be a laptop computer or other portable computing device embodied in an embedded system such as a set-top box, a personal data assistant (PDA), a mobile communication unit (e.g., a wireless phone), or other similar hardware platforms that have information processing and/or data storage and communication capabilities.

In some embodiments of the system, communication interface 1108 communicates with other systems by sending and receiving electrical, electromagnetic, or optical signals that carry digital data streams representing various types of information including program code. The communication may be established by way of a remote network (e.g., the Internet), or alternatively by way of transmission over a carrier wave.

Referring to FIG. 4, application software 1122 may comprise one or more computer programs that are executed on top of system software 1121 after being loaded from storage media 1106 into local memory 1102. In a client-server architecture, application software 1122 may comprise client software and server software. For example, in one embodiment, client software is executed on a personal computing system (not shown) and server software is executed on a server system (not shown).

Software environment 1120 may also comprise browser software 1126 for accessing data available over local or remote computing networks. Further, software environment 1120 may comprise a user interface 1124 (e.g., a Graphical User Interface (GUI)) for receiving user commands and data. Please note that the hardware and software architectures and environments described above are for purposes of example, and one or more embodiments of the invention may be implemented over any type of system architecture or processing environment.

It should also be understood that the logic code, programs, modules, processes, methods and the order in which the respective processes of each method are performed are purely exemplary. Depending on implementation, the processes can be performed in any order or in parallel, unless indicated otherwise in the present disclosure. Further, the logic code is not related, or limited to any particular programming language, and may comprise of one or more modules that execute on one or more processors in a distributed, non-distributed or multiprocessing environment. The noted processes may be carried out repeatedly or on demand.

The claimed subject matter has been described above with reference to one or more features or embodiments. Those skilled in the art will recognize, however, that changes and modifications may be made to these embodiments without departing from the scope of the claimed subject matter. These and various other adaptations and combinations of the embodiments disclosed are within the scope of the claimed subject matter as defined by the claims and their full scope of equivalents.

What is claimed is:

1. A system for processing data using snapshots, the system comprising:
   at least one hardware processor; and
   a memory, wherein the memory contains instructions which, when executed by the at least one processor, cause the at least one processor to perform the steps of:
   generating a primary snapshot of data stored in a first storage medium, wherein the primary snapshot is a copy of the data stored in the first storage medium at a first point in time;
   simultaneously generating multiple secondary snapshots of the primary snapshot, wherein the multiple secondary snapshots are copies of the primary snapshot of data stored on the first storage medium at the first point in time, wherein the secondary snapshots are generated by way of a copy-on-write mechanism at the first point in time,
   wherein the copy-on-write mechanism based on a requested snapshot operation is configured to physically copy data associated with the primary snapshot as stored on the first storage medium, in response to determining that the data is going to be modified at a second point in time, and to otherwise maintain a pointer to the data associated with the primary snapshot based on the requested snapshot operation, instead of making a physical copy of the target data; and
   extracting copies of the data that was stored in the first storage medium at the first point in time, by concurrently extracting respective copies of the data included in the multiple secondary snapshots in parallel, wherein multiple processing units concurrently transform the extracted data from the multiple secondary snapshots and concurrently load the transformed data onto a second storage medium in parallel.

2. The system of claim 1, wherein the data stored in the first storage medium is modified after the first point in time without disrupting processing of the data.

3. The system of claim 1, wherein the primary snapshot is generated by way of a data recovery scheme.

4. The system of claim 3, wherein the secondary snapshots are generated according to a data recovery scheme that recovers the data from the primary snapshot as if the data is being recovered after a power failure.

5. The system of claim 1, wherein the multiple processing units extract the data from the secondary snapshots in parallel.

6. The system of claim 1, wherein the multiple processing units transform the data in parallel.

7. The system of claim 1, wherein the multiple processing units load the data in a second storage medium in parallel.

8. The system of claim 1, further comprising deleting the primary and secondary snapshots after processing the data.

9. The system of claim 1, wherein a data management system supports parallel access to the secondary snapshots.

10. The system of claim 9, wherein the data management system communicates with an application programming interface (API) for each of the secondary snapshots to allow the data processing units to extract data from the secondary snapshots in parallel, wherein the data management system distributes to each API a proportional distribution of the data that is to be processed by a processing unit corresponding to each API.

11. A computer program product comprising a non-transitory computer useable medium having a computer readable program, wherein the computer readable program when executed on a computer causes the computer to:
   generate a primary snapshot of data stored in a first storage medium, wherein the primary snapshot is a copy of the data stored in the first storage medium at a first point in time;
   simultaneously generating two or more secondary snapshots of the primary snapshot, wherein the secondary snapshots are copies of the primary snapshot of data stored on the first storage medium at the first point in time, wherein the secondary snapshots are generated by way of a copy-on-write mechanism at the first point in time, wherein the copy-on-write mechanism is configured to physically copy data associated with the primary snapshot as stored on the first storage medium, just before the data is modified at a second point in time, and to otherwise maintain a pointer to the data associated with the primary snapshot instead of making a physical copy of the target data; and extract copies of the data that was stored in the first storage medium at the first point in time by concurrently extracting respective copies of the data included in the secondary snapshots in parallel, wherein multiple processing units concurrently transform the extracted data from the secondary snapshots and concurrently load the transformed data onto a second storage medium in parallel.

12. The computer program product of claim 11, wherein the data stored in the first storage medium is modified after the first point in time without disrupting processing of the data.

13. The computer program product of claim 11, wherein the primary snapshot is generated by way of a data recovery scheme.

14. The computer program product of claim 13, wherein the secondary snapshots are generated according to a data recovery scheme that recovers the data from the primary snapshot as if the data is being recovered after a power failure.

15. The computer program product of claim 11, wherein the multiple processing units extract the data from the secondary snapshots in parallel.

16. A method for processing data using snapshots, the method comprising:

generating a primary snapshot of data stored in a first storage medium, wherein the primary snapshot is a copy of the data stored in the first storage medium at a first point in time;

simultaneously generating multiple secondary snapshots of the primary snapshot, wherein the secondary snapshots are copies of primary snapshot of the data stored on the first storage medium at the first point in time, wherein the secondary snapshots are generated by way of a copy-on-write mechanism at the first point in time, wherein the copy-on-write mechanism based on a requested snapshot operation is configured to physically copy data associated with the primary snapshot as stored on the first storage medium, in response to determining that the data is going to be modified at a second point in time, and to otherwise maintain a pointer to the data associated with the primary snapshot based on the requested snapshot operation, instead of making a physical copy of the target data; and extracting copies of the data that was stored in the first storage medium at the first point in time by concurrently extracting respective copies of the data included in the multiple secondary snapshots in parallel, wherein multiple processing units concurrently transform the extracted data from the multiple secondary snapshots and concurrently load the transformed data onto a second storage medium in parallel.

17. The method of claim 16, wherein the data stored in the first storage medium is modified after the first point in time without disrupting processing of the data.

18. The method of claim 16, wherein the primary snapshot is generated by way of a data recovery scheme.

19. The method of claim 18, wherein the secondary snapshots are generated according to a data recovery scheme that recovers the data from the primary snapshot as if the data is being recovered after a power failure.

20. The method of claim 16, wherein the multiple processing units extract the data from the secondary snapshots in parallel.

21. The method of claim 16, wherein the multiple processing units transform the data in parallel.

22. The method of claim 16, wherein the multiple processing units load the data in a second storage medium in parallel.

23. The method of claim 16, further comprising deleting the primary and secondary snapshots after processing the data.

24. The method of claim 16, wherein a data management system supports parallel access to the secondary snapshots.

25. The method of claim 16, wherein the data management system communicates with an application programming interface (API) for each of the secondary snapshots to allow the data processing units to extract data from the secondary snapshots in parallel, wherein the data management system distribute to each API a proportional distribution of the data that is to be processed by a processing unit corresponding to each API.

* * * * *